Feb. 14, 1928.  
A. B. MERRILL  
1,659,371  
SPONGE RUBBER STRUCTURE AND METHOD OF MAKING THE SAME  
Filed March 24, 1923
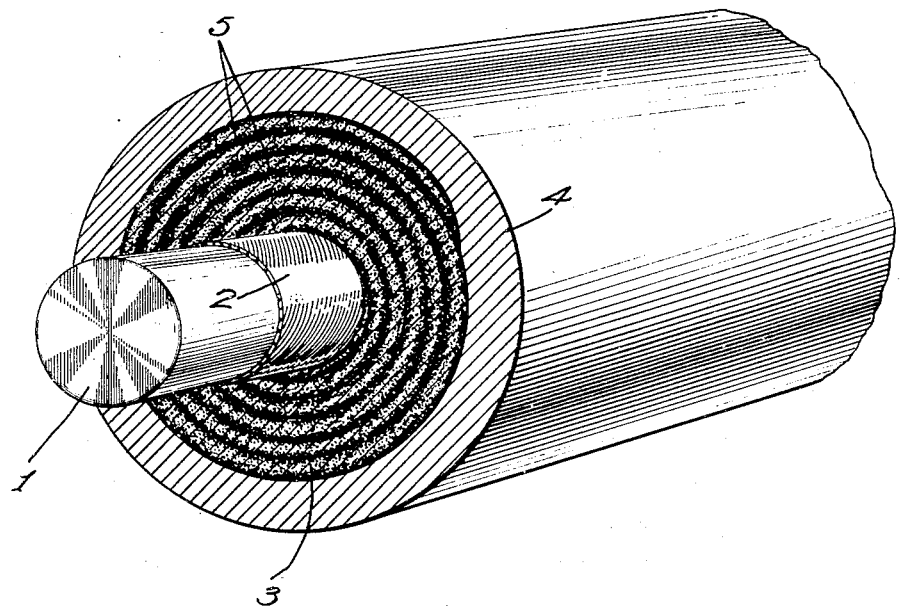
INVENTOR  
Allan B. Merrill.  
By Robert McPherson  
Atty Patented Feb. 14, 1928.

1,659,371

UNITED STATES PATENT OFFICE.

ALLAN B. MERRILL, OF AKRON, OHIO, ASSIGNOR TO THE B. F. GOODRICH COMPANY, OF NEW YORK, N. Y., A CORPORATION OF NEW YORK.

SPONGE-RUBBER STRUCTURE AND METHOD OF MAKING THE SAME.

Application filed March 24, 1923. Serial No. 627,303.

This invention relates to articles of manufacture containing sponge-rubber as a cushioning or other element, and its object is to provide a structure of this type having greater strength and durability and also to furnish a method of manufacturing such structures at a reduced cost and with less liability to failure or imperfect results as compared with former structures and methods in this art.

Examples of uses to which my invention may be put are the inking-rollers for printing presses, and sleeve packers for oil-well casings, but the invention is further adapted to a wide variety of situations where the cushioning properties, lightness, or other properties of sponge-rubber are desirable.

The accompanying drawing is a sectional, perspective view showing a printing-press inking-roller embodying and adapted to be made according to my invention.

In the drawing, 1 is the roller-shaft having a wrapping of rubberized fabric 2 cemented thereto for an anchorage between the shaft and the rubber body of the roller, 3 is a cylindrical, soft, sponge-rubber core or body formed about the shaft, and 4 is a solid, cylindrical, soft-rubber tread, shell or outer wearing portion surrounding the core 3 and forming the ink-carrying surface.

The core 3, while essentially of sponge-rubber, is also provided with thin, concentric laminations 5 of substantially-continuous rubber, forming a skin upon the intervening layers or laminations or sponge-rubber, with the result that when the parts of the roller are vulcanized together, the core 3 has greater strength and durability than if it possessed throughout the uniform cellular structure of ordinary sponge-rubber.

In preparing and fabricating the core 3, I take a sheet of raw, sponge-rubber stock compounded with vulcanizing and blowing agents, and semi-cure it between the platens of a hot-plate press or in any other suitable manner, the heat being sufficient to vaporize the blowing agent and produce the cellular formation while the contact of the two surfaces with the hot platens forms the characteristic skin of substantially continuous rubber upon said surfaces.

The semi-cured sponge sheet is then removed from the press and allowed to cool. There is considerable shrinkage during the cooling, and it is one of the advantages of my process that this shrinkage is allowed to occur freely in the sheeted element rather than in the ultimate roller or other completed article.

The semi-cured sponge-rubber sheet is then coated with vulcanizable rubber cement on both surfaces, and when the cement has dried to a condition of tackiness said sheet is wrapped on the fabric cover 2 of the shaft 1 to form the laminated core 3. This can obviously be done either in the form of concentric cylinders or as a continuous spiral wrapping, the latter method being preferred as involving less time and labor. Each layer is rolled down separately to improve the adhesion and remove air from between the layers.

After the core has been built up in this manner, a sheet of raw, solid-rubber stock of suitable composition is then mounted upon the core to form the tread or outer shell 4 and the structure is confined within a mold or by a wrapping of wet cloth, (preferably the latter) and subjected to a vulcanizing heat of such temperature and duration as to complete the vulcanization of the core 3 and at the same time vulcanize the tread member 4.

The solid laminations 5 in the product are made up of the skins on the faces of adjacent layers, plus added rubber deposited from the cement or solution, but I do not limit myself to such relatively-thin members 5 and might, for example, roll up an additional sheet of solid rubber with the sponge rubber sheet, or ply it up with the raw stock before semi-curing, as will be understood without special illustration.

The final step is to remove the mold or wrappings and finish the roller in the usual way, as by grinding its surface to the form of a true cylinder.

Besides eliminating excessive shrinkage of the sponge-rubber in the final product, my improved method is simple and inexpensive, and it involves much more uniform and certain results than are obtainable by the old methods of building up and vulcanizing a relatively-thick sponge-rubber core or other structure. The sponge-rubber can be semi-cured in very long sheets, with resultant saving in time and labor. The semi-cured sponge sheet does not have to be accurate as to gauge or thickness, for the desired ultimate thickness can be obtained in a product merely by rolling up a greater or less length of the sheet.

In addition to the manufacture of cushioning structures of soft sponge-rubber, my invention may also be used for making articles composed of or containing sponge hard rubber.

Obviously, the structure itself may have any suitable form appropriate to its purpose, and the details of embodiment and procedure may be variously modified within the scope of my invention.

I claim:

1. A roller comprising an outer, continuous tread and a core united therewith and composed of alternating laminations of sponge-rubber and solid rubber.

2. A roller comprising a shell of solid, soft rubber and a cushion core vulcanized thereto and composed of alternating laminations of soft sponge-rubber and a substantially-continuous sponge-rubber skin.

3. An inking-roller for printing presses comprising a spirally-laminated sponge-rubber body.

4. An inking-roller for printing presses comprising a laminated, soft, sponge-rubber body consisting of a skin-coated sheet wrapped spirally upon itself and vulcanized into a unitary structure.

5. An article of manufacture adapted for use as an inking-roller for printing presses and comprising a shaft, a relatively-thick cushion core vulcanized thereon and consisting of a spirally-wrapped sheet of skin-covered, soft sponge-rubber and a cylindrical outer tread or shell or solid, soft rubber vulcanized upon said core.

6. The method of making sponge-rubber structures which comprises semi-curing sponge-rubber in sheet form, building up a laminated structure thereof, and finally vulcanizing said structure.

7. The method of making sponge-rubber cushion structures which comprises semi-curing soft sponge-rubber in sheet form, building a laminated structure thereof, and vulcanizing the laminations together.

8. The method of making sponge-rubber structures which comprises semi-curing sponge-rubber in sheet form, allowing free shrinkage thereof by cooling, cementing the sheet stock, building it into a laminated structure, and vulcanizing the laminations together.

9. The method of making rubber structures which comprises semi-curing sponge-rubber in sheet form, wrapping such a sheet spirally upon itself, and finally vulcanizing the structure.

10. The method of making cushioned rubber structures which comprises semi-curing soft sponge-rubber in sheet form, applying cement to such a sheet, wrapping the sheet spirally to form a core, applying a solid, soft-rubber shell to said core, and vulcanizing said shell and core together.

11. The method of making composite sponge-rubber structures which comprises forming a semi-cured sponge-rubber element, adding uncured, vulcanizable rubber thereto, and vulcanizing the composite structure.

12. The method of making rubber rollers which comprises semi-curing soft sponge-rubber in sheet form, wrapping it about a shaft to form a cushion element, covering said element with solid, soft rubber, and vulcanizing the composite structure.

13. The method of making sponge rubber structures which comprises semi-curing the stock to a spongy condition, cooling it to allow shrinkage, and finally vulcanizing it in a definite form.

In witness whereof I have hereunto set my hand this 17 day of March, 1923.

ALLAN B. MERRILL.